United States Patent [19]

Ino et al.

[11] Patent Number: 5,271,857
[45] Date of Patent: Dec. 21, 1993

[54] PROCESS FOR PREPARING MAGNETIC COATING COMPOSITION

[75] Inventors: Tadashi Ino; Nobuhiro Shinka; Shigeo Daimon, all of Settsu, Japan

[73] Assignee: Daikin Industries, Ltd., Osaka, Japan

[21] Appl. No.: 828,625

[22] Filed: Jan. 31, 1992

[30] Foreign Application Priority Data

Jan. 31, 1991 [JP] Japan ................ 3-032260

[51] Int. Cl.$^5$ .................. H01F 10/14; H01F 10/18
[52] U.S. Cl. ............... 252/62.54; 252/62.51; 252/62.55; 106/37
[58] Field of Search ........... 106/37; 252/62.54, 62.51, 252/62.53, 62.55

[56] References Cited

U.S. PATENT DOCUMENTS 4,305,993 12/1981 Zaitsu et al. ................... 428/328
4,842,759 6/1989 Okamura et al. ............... 252/62.51
4,863,795 9/1989 Nakamura et al. .............. 428/329

FOREIGN PATENT DOCUMENTS 124023 1/1985 Japan.

*Primary Examiner*—Mark L. Bell
*Assistant Examiner*—Margaret Einsmann
*Attorney, Agent, or Firm*—Nikaido, Marmelstein, Murray & Oram

[57] ABSTRACT

The present invention provides a process for preparing a magnetic coating composition with use of magnetic particles containing carbon or magnetic particles consisting primarily of an iron carbide, the process being characterized in that the process includes the step of pre-kneading the magnetic particles with an organic solvent.

6 Claims, No Drawings

PROCESS FOR PREPARING MAGNETIC COATING COMPOSITION

The present invention relates to a process for preparing magnetic coating compositions having magnetic particles incorporated therein with high dispersibility.

Magnetic materials heretofore used for magnetic recording media are γ-iron oxide, cobalt-containing γ-iron oxide, chromium dioxide, ferromagnetic metal powders, etc., while particles containing an iron carbide have attracted attention in recent years because these particles have a suitable coercive force and suitable electrical conductivity and are usable for recording and reproduction with a low noise level. Magnetic recording media containing an iron carbide are obtained by forming on a nonmagnetic substrate a magnetic layer comprising iron carbide-containing particles and a binder. The iron carbide-containing particles are different from the conventional magnetic particles in surface properties, exhibit poor compatibility with the binder and are not dispersible in the binder effectively, consequently presenting difficulty in affording a magnetic recording medium having excellent characteristics expectable from the magnetic characteristics of the material in the state of particles.

More specifically, JP-A-124023/1985 discloses a magnetic tape prepared using particles chiefly comprising an iron carbide and vinyl chloride-vinyl acetate copolymer serving as a binder, whereas we have found that the magnetic tape is extremely low in gloss and unsatisfactory in magnetic characteristics since the particles have poor dispersibility in this binder.

Further carbon-containing magnetic particles, like the above iron carbide-containing magnetic particles, exhibit poor compatibility with binders and are difficult to disperse in binders effectively.

An object of the present invention is to provide a process for preparing a magnetic coating composition with use of magnetic particles containing carbon or magnetic particles consisting primarily of an iron carbide, the process permitting the magnetic particles to be dispersed in a binder easily to enable the composition to afford a magnetic recording material which is excellent in gloss and magnetic characteristics.

The above and other objects of the invention will become apparent from the following description.

The present invention provides a process for preparing a magnetic coating composition with use of magnetic particles containing carbon or magnetic particles consisting primarily of an iron carbide, the process being characterized in that the process includes the step of pre-kneading the magnetic particles with an organic solvent.

According to the invention, the magnetic particles containing carbon can be magnetic particles comprising carbon and metal iron. Further according to the invention, the magnetic particles consisting primarily of an iron carbide can be, for example, acicular fine particles of an iron carbide disclosed in JP-A-71509/1985, JP-A-111921/1986, etc. The iron carbide contained in such fine particles as the main component is $Fe_5C_2$, $Fe_7C_3$, $Fe_{20}C_7$ or $Fe_3C$. Also usable in the process of the invention is a mixture of above magnetic particles and other carbon-free magnetic particles.

Acicular fine particles of iron carbide are prepared, for example, by (a) optionally contacting a carbon-free reducing agent with an acicular iron oxyhydroxide or acicular iron oxide, and
(b) contacting the iron compound of the above step (a) with a carbon-containing reducing agent or a mixture of the agent and a carbon-free reducing agent.

Examples of preferred acicular iron oxyhydroxides for use in this process are acicular α-FeOOH (goethite), acicular β-FeOOH (akaganite) and acicular γ-FeOOH (lepidocrosite). Examples of preferred acicular iron oxides are acicular α-$Fe_2O_3$ (hematite), acicular γ-$Fe_2O_3$ (maghemite) and acicular $Fe_3O_4$ (magnetite). Acicular β-FeOOH is preferably treated with an aqueous solution of alkaline compound.

Acicular α-$Fe_2O_3$ or acicular γ-$Fe_2O_3$ is, for example, any of one prepared by heating acicular α-FeOOH, acicular β-FeOOH or acicular γ-FeOOH at about 200° to about 350° C., followed by dehydration, acicular α-$Fe_2O_3$ or acicular γ-$Fe_2O_3$ prepared by heating the resulting product further at about 350° to about 900° C. to compact the crystals, and others.

The above-mentioned acicular $Fe_3O_4$ can be prepared by contacting an acicular iron oxide other than acicular $Fe_3O_4$ or acicular iron oxyhydroxide with a carbon-containing reducing agent or a carbon-free reducing agent, or a mixture thereof, although the $Fe_3O_4$ is not limited to one prepared in those methods. When the carbon-containing reducing agent or mixture thereof with the carbon-free reducing agent is contacted with the acicular iron oxyhydroxide or acicular iron oxide other than acicular $Fe_3O_4$ to prepare acicular $Fe_3O_4$, the same contact conditions as those in the process of the invention can also be employed except for the time condition. In this case, the acicular $Fe_3O_4$ formed can be subsequently held in contact with the gas under the same conditions as in the preceding reaction without any interruption to obtain the desired acicular particulate material of the invention.

The acicular iron oxyhydroxides or acicular iron oxides can be those usually at least 3, preferably 5 to 15, in average axial ratio and having an average particle size (long axis) of usually up to 1.0 μm, preferably 0.1 to 1.0 μm.

The starting material to be used for the process for producing acicular iron carbide fine particles according to the invention may have added thereto a small amount or small amounts of a compound, such as oxide or carbonate of copper, magnesium, manganese or nickel, silicon oxide, potassium salt, sodium salt, etc., insofar as the starting material is acicular and chiefly comprises an iron oxyhydroxide or iron oxide.

The starting acicular iron oxyhydroxide preferably has a pH of at least 5 on the surface thereof as disclosed in JP-A-108309/1985. The acicular particles then produced have a higher coercive force. The starting iron oxyhydroxide having a pH of less than 5 can be used after it is increased to at least 5 in pH by contact with an aqueous solution of an alkali compound (e.g., sodium hydroxide, potassium hydroxide, ammonium hydroxide). Further, alkali-treated acicular iron oxide can also be used. The starting material can be treated with an alkaline compound by contacting the material with an aqueous solution of sodium hydroxide, potassium hydroxide, ammonium hydroxide or like alkaline compound (e.g., with an aqueous solution having a pH of at least 8, preferably at least 10), stirring the mixture for 30 minutes to 1 hour when required, filtering the mixture and drying the resulting cake.

Acicular iron oxyhydroxide or iron oxide can be coated with a cobalt compound, for example, by dispersing the iron compound in an aqueous solution of a cobalt salt (e.g., dilute solution of 0.1 to 10% by weight) with stirring at room temperature or with heating, and rendering the dispersion alkaline with addition of an aqueous solution of an alkaline compound, followed by stirring for 30 minutes to 1 hour when required, filtering and drying.

The starting iron compound can be used as coated with a sintering-preventing agent as disclosed in JP-A-141611/1985. Examples of useful agents are silicone compound, boron compound, aluminum compound, aliphatic carboxylic acid or salt thereof, phosphorus compound, titanium compound, etc.

In the present invention, typical examples of carbon-free reducing agents are $H_2$, $NH_2NH_2$, etc.

As the carbon-containing reducing agent, at least one of the following compounds can be used.

① CO
② aliphatic, linear or cyclic, saturated or unsaturated hydrocarbons such as methane, propane, butane, cyclohexane, methylcyclohexane, acetylene, ethylene, propylene, butadiene, isoprene, town gas, etc.
③ aromatic hydrocarbons such as benzene, toluene, xylene, alkylated or alkenylated derivatives thereof having a boiling point up to 150° C.
④ aliphatic alcohols such as methanol, ethanol, propanol, cyclohexanol, etc.
⑤ esters such as methyl formate, ethyl acetate and like ester having a boiling point up to 150° C.
⑥ ethers such as lower alkyl ether, vinyl ether and like ether having a boiling point up to 150° C.
⑦ aldehydes such as formaldehyde, acetaldehyde and like aldehyde having a boiling point up to 150° C.
⑧ ketones such as acetone, methyl ethyl ketone, methyl isobutyl ketone and like ketone having a boiling point up to 150° C.

Particularly preferable carbon-containing reducing agents are CO, $CH_3OH$, $HCOOCH_3$, and saturated or unsaturated aliphatic hydrocarbons having 1 to 5 carbon atoms.

In the step (a), the carbon-free reducing agent can be used as it is or as diluted. Examples of diluents are $N_2$, argon, helium, etc. The dilution ratio is suitably selected but is preferably about 1.1 to about 10 times (by volume). The contact temperature, contact time, gas flow rate and other conditions are suitably determined since these conditions depend, for example, on the production history, average axial ratio, average particle size and specific surface area of the acicular iron oxyhydroxide or acicular iron oxide. The preferred contact temperature is about 200° to about 700° C., more preferably about 300° to about 400° C. The preferred contact time is about 0.5 to about 6 hours. The preferred gas flow rate (excluding diluent) is about 1 to about 1000 ml S.T.P./min, more preferably about 5 to about 500 ml S.T.P./min, per gram of the starting material. The contact pressure inclusive of that of the diluent is usually 1 to 2 atom. although not limitative particularly.

In the step (b), the carbon-containing reducing agent or mixture thereof with the carbon-free reducing agent can be used also as it is or as diluted. When the mixture is used, the mixing ratio of the carbon-containing reducing agent and the carbon-free reducing agent is suitably selected but is preferably 1/0.05 to 1/5 by volume.

Contact conditions are also suitably selected but the preferred contact temperature is about 250° to about 400° C., more preferably about 300° to about 400° C. The preferred contact time is about 0.5 to 6 hours when the step (a) is conducted, and about 1 to about 12 hours when the step (a) is not conducted. The preferred gas flow rate (excluding diluent) is about 1 to about 1000 ml S.T.P./min, more preferably about 5 to about 500 ml S.T.P./ml, per gram of the starting iron compound. The contact pressure inclusive of that of the diluent is usually 1 to 2 atom. although not limitative particularly.

The iron carbide thus obtained is represented by the formula FexC ($x \geq 2$) and consists primarily of $Fe_5C_2$, with $Fe_{20}C_7$, $Fe_7C_3$, $Fe_3C$, etc. present conjointly therewith.

According to the invention, the magnetic particles containing carbon can be obtained by contacting a carbon-free reducing agent with magnetic particles chiefly comprising an iron carbide. Examples of carbon-free reducing agents usable are $H_2$, $NH_2NH_2$, etc. like those already mentioned. The preferred contact temperature is about 300° to about 500° C. The preferred contact time is about 0.5 to about 6 hours. The same diluents as already mentioned are usable when required. The preferred gas flow rate (excluding the diluent) is about 1 to about 1000 ml S.T.P./min. The contact pressure inclusive of that of the diluent is usually 1 to 2 atm. although not limited specifically. From the magnetic particles thus obtained, $\alpha$-iron only is detected by X-rays and carbon is detected by elementary analysis. The metal iron fine particles are 5 to 15 in average axial ratio and usually up to 1.0 μm, preferably 0.1 to 1.0 μm, in average particle size (long axis).

The process for preparing the magnetic coating composition of the present invention is characterized in that the magnetic particles are kneaded with an organic solvent before the particles are fully dispersed in the binder.

In the present invention, a mixture having high solid concentration is kneaded or mixed. Thus, it is simple and practical to calculate shearing stress from required power in case of a kneader and from size of medium and momentum in case of a disperser using a medium.

For example, in case of a kneader, $$T = rR^2 Ls \qquad ①$$

$$HP_1 = T(2\pi N)/750000 \qquad ②$$

from ① and ②

$$s = 750000 HP_1/(2\pi N) r \cdot R^2 L \qquad ③$$

wherein
T: torque
$HP_1$: power [HP]
N [rps]: revolution of arm
r [rad]: angle range in which shearing force is given to the kneaded mixture
R [cm]: radius of a vessel
L [cm]: height of a vessel From ③, although maximum of shearing stress depends on a scale of an apparatus used, shearing stress is preferably 0.1 to 10 kg·cm$^{-2}$. The kneading operation under a high shearing stress can be realized by kneading the magnetic particles with the solvent at a high viscosity, i.e., with use of about 25 to 50 parts by weight of the solvent per 100 parts by weight of the particles, in the case where no medium is used for the kneader employed. When the kneader employs a medium, the organic solvent is usable in an amount varying over a wide range of up to 200 parts by weight per 100 parts by weight of the particles because the medium gives a high shearing stress. The magnetic particles may be charged into the kneader at a time but can be placed into the kneader in portions or continuously. An abrasive, antistatic agent or like inorganic substance may be present in the mixture to be kneaded. A dispersant and lubricant can also be added to the mixture.

The organic solvents usable in the kneading step of the invention include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol monoethyl ether acetate; ethers such as ether, glycol dimethyl ether, glycol monoethyl ether and dioxane; aromatic hydrocarbons such as benzene, toluene and xylene; chlorinated hydrocarbons such as methylene chloride, ethylene chloride, carbon tetrachloride, chloroform, ethylene chlorohydrin and dichlorobenzene; and the like.

In the kneading step of the invention, it is desirable to use the magnetic particles and the organic solvent in the ratio by weight of 100:25 to 100:200.

Examples will be given below of other additives, binders, apparatus, methods, etc. for use in the common steps following the kneading step and included in the process of the invention.

The apparatus to be used for kneading is not limited specifically but can be, for example, at least one of twin roll, triple roll, kneader, planetary mixer, co-kneader, intensive mixer, single-screw extruder, twin-screw extruder, ball mill, vibration ball mill, sand grinder, attritor, etc. Other apparatus for use in preparing the coating composition are not limited specifically. At least one apparatus can be selected for use, for example, from among high-speed impeller-disperser, disperser, homogenizer, dissolver, etc.

The binder to be used in the invention is a known thermoplastic resin, thermosetting resin, reaction-type resin or a mixture of such resins.

Suitable thermoplastic resins are those which have a softening point of about 150° C. or less, an average molecular weight of about 10,000 to 200,000, and a degree of polymerization of about 200 to 2,000, e.g., a vinyl chloridevinyl acetate copolymer, vinyl chloride-vinylidene chloride copolymer, vinyl chloride-acrylonitrile copolymer, acrylate-acrylonitrile copolymer, acrylate-vinylidene chloride copolymer, acrylate-styrene copolymer, methacrylate-acrylonitrile copolymer, methacrylate-vinylidene chloride copolymer, methacrylate-styrene copolymer, urethane elastomer, polyvinyl fluoride, vinylidene chloride-acrylonitrile copolymer, butadiene-acrylonitrile copolymer, polyamide resin, polyvinyl butyral, cellulose derivatives such as cellulose acetate butyrate, cellulose diacetate, cellulose triacetate, cellulose propionate, cellulose nitrate, and the like, styrene-butadiene copolymer, polyester resin, chlorovinyl ether-acrylate copolymer, amino resin, various synthetic rubber based thermoplastic resins and mixtures thereof.

Suitable thermosetting resins or reaction-type resins have a molecular weight of about 200,000 or less as a coating solution, and when heated after coating and drying, the molecular weight becomes infinite due to reactions such as condensation, addition, and the like.

Of these resins, preferred resins are those resins which do not soften or melt before the resin thermally decomposes. Representative examples of these resins are a phenol resin, epoxy resin, polyurethane hardening type resin, urea resin, melamine resin, alkyd resin, silicone resin, acryl-based reactive resin, epoxy-polyamide resin, mixture of a high-molecular-weight polyester resin and an isocyanate prepolymer, mixture of a methacrylic acid copolymer and a diisocyanate prepolymer, mixture of a polyester-polyol and a polyisocyanate, urea-formaldehyde resin, mixture of a low molecular weight glycol, a high molecular weight diol and triphenylmethane triisocyanate, polyamine resin, and mixtures thereof, etc.

Useful dispersing agents include aliphatic acids having 12 to 18 carbon atoms ($R^1COOH$ wherein $R^1$ is an alkyl group having 11 to 17 carbon atoms) such as caprylic acid, capric acid, lauric acid, myristic acid, palmitic acid, stearic acid, oleic acid, elaidic acid, linolic acid, linolenic acid and stearolic acid; metal soaps comprising an alkali metal (such as Li, Na or K) salt of such a fatty acid; anionic surfactants such as alkylsulfuric acid salts, sulfuric acid salt of polyoxyethylene alkyl ethers and acetic acid salts of polyoxyethylene alkyl ethers; fatty acid esters of polyhydric alcohols such as sorbitan, polyethylene glycol, glycerin and polyglycerin; abovementioned compounds having a polyoxyethylene, polyoxypropylene or like side chain; nonionic surfactants such as condensates of polyoxyethylene alkyl ethers, polyoxypropylene alkyl ethers, polyoxyethylene polyoxypropylene alkyl ethers, polyoxyethylene alkyl phenyl ethers and polyoxyethylene alkyl phenyl formaldehyde, polyoxyethylene alkylamines and fatty acid amides; cationic surfactants such as alkylammonium salts; metal soaps comprising an alkaline earth metal (Mg, Ca, Ba or the like); lecithin; etc. Also usable are higher alcohols having at least 12 carbon atoms, and sulfuric acid esters of such alcohols. Among these, nonionic surfactants are especially desirable. These dispersing agents are used in an amount of 1 to 20 parts by weight per 100 parts by weight of the binder.

Examples of useful lubricants include silicone oil, graphite, molybdenum disulfide, tungsten disulfide, aliphatic esters obtained from monobasic aliphatic acids having 12 to 16 carbon atoms and monohydric alcohols having 3 to 12 carbon atoms, aliphatic esters obtained from monobasic aliphatic acids having 17 or more carbon atoms and monohydric alcohols having such a number of carbon atoms that the resulting ester has 21 to 23 carbon atoms in total, etc. These lubricants are added in an amount of 0.2 to 20 parts by weight per 100 parts by weight of the binder.

The abrasives to be used include those which are generally used, such as fused alumina, silicon carbide, chromium oxide, corundum, artificial corundum, diamond, artificial diamond, garnet and emery (main comonents: corundum and magnetite). The mean particle size of these abrasives is 0.05 to 5 $\mu$m, preferably 0.1 to 2 $\mu$m. These abrasives are added in an amount of 7 to 20 parts by weight per 100 parts by weight of the binder.

Examples of useful antistatic agents are natural surfactants such as saponin; nonionic surfactants such as alkylene oxide-base, glycerin-base or glycidol-base surfactant; cationic surfactants such as higher alkylamines, quaternary ammonium salts, pyridine and like heterocyclic compounds, phosphonium or sulfonium compounds; anionic surfactants such as those containing a carboxylic acid, sulfonic acid or phosphoric acid group, sulfate group or phosphate group or like acid group; ampholytic surfactants such as amino acids, amino sulfonic acid, sulfate or phosphate of aminoalcohol, etc. These antistatic agents can be used singly or in mixture.

Although the above compounds are used as antistatic agents, the compounds can be used in some cases to improve the dispersibility, magnetic characteristics, lubricability or coating ability.

Magnetic recording layers are formed by dissolving the above components in an organic solvent and applying the resulting coating composition to a substrate (support).

The thickness of the support to be used is conventional and is about 5 to 50 μm, preferably about 10 to 40 μm. The materials useful for the support include polyesters such as polyethylene terephthalate and polyethylene-2,6-naphthalate, polyolefins such as polypropylene, cellulose derivatives such as cellulose triacetate and cellulose diacetate, polycarbonate, and the like.

For preventing static discharge or preventing transfer printing, the above supports may have a back coat on the surface opposite the surface provided with the recording layer.

The supports may be in any shape such as a tape, sheet, card, disc or drum, and various materials can be used depending upon the shape desired.

The magnetic coating composition can be applied on the support by various conventional methods including air doctor coating, blade coating, air knife coating, squeeze coating, impregnation coating, reverse roll coating, transfer roll coating, gravure coating, kiss coating, cast coating and spray coating. Other coating methods can also be used.

The recording layer formed on the support by the above method is dried after, if desired, the coating has been subjected to a treatment for orienting the magnetic powder in the layer. If required, the magnetic layer can be subjected to a surface smoothening treatment, or cut to the desired shape, to thereby form a magnetic recording material. In the above orienting treatment for the recording layer, the orienting magnetic field can be either an AC or DC magnetic field with a field strength of about 500 to 5,000 gauss. The drying temperature can range from about 50° to about 100° C., and the drying time is about 3 to 10 minutes.

The invention will be described with reference to the following examples, in which the parts and percentages are by weight.

REFERENCE EXAMPLE 1

Goethite particles (5 kg) having a mean particle size of 0.7 μm (long axis) and an average axial ratio of 10 were placed into a retort reactor and dehydrated at 330° C. for one hour by passing air through the reactor. With the passage of air thereafter discontinued, the inside air was replaced by nitrogen, and the particles were treated at the same temperature for 5 hours while introducing CO into the reactor and were then allowed to cool to room temperature to obtain black acicular particles (hereinafter referred to as "magnetic powder C"). X-ray diffractiometry revealed that the product consisted primarily of $Fe_5C_2$.

REFERENCE EXAMPLE 2

Acicular magnetic particles (hereinafter referred to as "magnetic powder D") consisting primarily of $Fe_5C_2$ were prepared in the same manner as in Reference Example 1 except that the reaction temperature was 350° C.

REFERENCE EXAMPLE 3

Acicular magnetic particles (hereinafter referred to as "magnetic powder E") consisting primarily of $Fe_5C_2$ were prepared in the same manner as in Reference Example 1 except that the reaction temperature was 370° C.

REFERENCE EXAMPLE 4

Goethite particles were reacted with CO by the same process as in Reference Example 1, then treated for 1 hour with $H_2$ introduced into the reactor and thereafter allowed to cool to room temperature to obtain acicular particles (hereinafter referred to as "magnetic powder B") containing black carbon. X-ray diffractiometry detected α-Fe only in the product, which was found to contain 5% of carbon by elementary analysis.

REFERENCE EXAMPLE 5

Carbon-containing acicular particles (hereinafter referred to as "magnetic powder A") were prepared in the same manner as in Reference Example 1 with the exception of using goethite particles serving as a starting material and having a mean particle size of 0.4 μm (long axis) and an average axial ratio of 10. X-ray diffractiometry detected α-Fe only in the product, which was found to contain 6% of carbon by elementary analysis.

Table 1 shows the magnetic characteristics of the magnetic particles used.

TABLE 1

| magnetic powder | coercive force (Oe) | saturation magnetization (emu · g$^{-1}$) | specific surface area (m$^2$ · g$^{-1}$) | packing density (g · cm$^{-1}$) |
|---|---|---|---|---|
| A | 1580 | 157 | 54.6 | 0.25 |
| B | 1250 | 162 | 59.2 | 0.50 |
| C | 1020 | 96 | 45.3 | 0.33 |
| D | 940 | 101 | 46.2 | 0.51 |
| E | 850 | 97 | 44.3 | 0.87 |

Table 2 shows the composition of the organic solvents used.

TABLE 2

| solvent | MEK | MIBK | toluene | cyclohexanone |
|---|---|---|---|---|
| a | 0 | 0 | 1 | 0 |
| b | 3 | 0 | 2 | 1 |
| c | 2 | 1 | 1 | 0 |
| d | 1 | 0 | 1 | 1 |

Kneading apparatus:
  Open kneader (product of Moriyama Seisakusho Co., Ltd.)
  Pressurized kneader (product of Moriyama Seisakusho Co., Ltd.)
  Planetary mixer (product of Tokushu Kika Kogyo Co., Ltd.)
  Attritor (product of Mitsui-Miike Kogyo Co., Ltd.)
Dispersing apparatus:
  Dissolver (Model FFBH3, product of WAB Co., Ltd.)
  Sand grinder (product of WAB Co., Ltd.)

EXAMPLE 1

(1) Kneading step

Eighty parts by weight of magnetic powder A and 70 parts by weight of solvent b were placed into an open kneader and kneaded for 10 minutes. While continuously kneading the mixture thereafter, magnetic powder A was added to the mixture four times at an interval of 10 minutes, in an amount of 30 parts by weight each time. With further addition of the solvent, the resulting mixture was made into a composition comprising the magnetic powders in a combined amount of 200 parts by weight and 70 parts by weight of the solvent, and the composition was kneaded subsequently for 3 hours to obtain a kneaded magnetic powder.

The open kneader used is Model S5-2 type kneader (rating: 3.5 HP) which is a product of Moriyama Seisakusho Co., Ltd.

In this example, $HP_1 = 0.9$ [HP], $N = 1$ [rps], $r = 2/3\pi$, $R = 6$ [cm], $L = 22$ [cm], and shearing stress $(s) = 0.65$ kg·cm$^{-2}$.

(2) Dispersing-mixing step

The magnetic powder (135 parts by weight) thus treated and 5 parts by weight of $Al_2O_3$ were mixed with a solution obtained by adding 10 parts by weight of a vinyl chloride binder (MR-110, product of Nippon Zeon Co., Ltd.) and 33 parts by weight of 30% solution of polyurethane binder (Pandex T-5201H, product of Dainippon Ink & Chemicals Inc.) to 60 parts by weight of solvent b. With further addition of solvent b, the mixture was so adjusted that it contained the solvent in a combined amount of 220 parts by weight, followed by mixing in a dissolver for 30 minutes. The resulting mixture was then treated by a continuous-type sand grinder for 2 hours.

Two parts by weight of stearic acid and 1 part by weight of butyl stearate serving as lubricants and 4 parts by weight of Coronate L (product of Nihon Polyurethane Co, Ltd.) serving as a curing agent were dissolved in 25 parts by weight of a solvent. The solution was added to the mixture, followed by mixing in a dissolver for 30 minutes and filtration with a 3-μm filter to obtain a magnetic coating composition.

(3) Coating-orientation step

The coating composition obtained was applied to a polyethylene terephthalate (PET) film to a thickness of 5 μm when dried. While still wet, the coating was subjected to an orientation treatment passed through a repellent magnetic field to obtain a magnetic tape.

EXAMPLES 2 TO 11

A magnetic tape was prepared in the same manner as in Example 1 except that the kneading step was performed using the kneading apparatus, addition method, magnetic powder, solvent composition and magnetic powder/solvent ratio listed in Tables 3 and 4.

COMPARATIVE EXAMPLES 1 AND 2

A magnetic tape was prepared in the same manner as in Example 1 by directly performing the dispersing-mixing step (2) without conducting the kneading step (1) for the magnetic powder and organic solvent.

The coating obtained was tested for magnetic characteristics and gloss. Table 5 shows the result obtained for the carbon-containing magnetic powder, and Table 6 shows the result obtained for iron carbide-containing magnetic particles.

COMPARATIVE EXAMPLE 3

Magnetic powder A (100 parts by weight) and 150 parts by weight of solvent b were stirred in a dissolver for 3 hours without subjecting the mixture to a high shearing stress, followed by the same procedure as in Example 1 to obtain a magnetic tape.

TABLE 3

| | mixing apparatus | addition method (*1) | magnetic powder | solvent | magnetic powder/solvent |
|---|---|---|---|---|---|
| Ex. | | | | | |
| 2 | open kneader | 4 | A | a | 100/45 |
| 3 | pressurized kneader | 2 | A | a | 100/25 |
| 4 | open kneader | 4 | A | d | 100/35 |
| 5 | open kneader | 4 | A | c | 100/35 |
| 6 | planetary mixer | continuous | A | b | 100/45 |
| 7 | open kneader | 4 | B | b | 100/35 |
| 8 | attritor | 1 | A | b | 100/150 |
| Com. Ex. | | | | | |
| 1 | — | — | A | — | — |
| 3 | dissolver | 1 | A | b | 100/150 |

Note:
(*1) Number of addition

TABLE 4

| | mixing apparatus | addition method (*1) | magnetic powder | solvent | magnetic powder/solvent |
|---|---|---|---|---|---|
| Ex. | | | | | |
| 9 | open kneader | 4 | C | b | 100/40 |
| 10 | planetary mixer | 4 | D | d | 100/45 |
| 11 | open kneader | 4 | E | a | 100/30 |
| Com. Ex. 2 | — | — | D | — | — |

Note:
(*1) same as above

TABLE 5

| result | coercive force (Oe) | saturation flux density | square ratio | gloss |
|---|---|---|---|---|
| Ex. | | | | |
| 1 | 1550 | 4100 | 0.87 | 175 |
| 2 | 1540 | 4020 | 0.85 | 170 |
| 3 | 1550 | 4150 | 0 88 | 177 |
| 4 | 1530 | 4100 | 0.87 | 171 |
| 5 | 1560 | 4130 | 0.89 | 178 |
| 6 | 1580 | 3990 | 0.85 | 168 |
| 7 | 1190 | 4180 | 0.90 | 175 |
| 8 | 1550 | 4150 | 0.83 | 177 |
| Com. Ex. | | | | |
| 1 | 1600 | 3250 | 0.75 | 120 |
| 3 | 1590 | 3190 | 0.74 | 113 |

TABLE 6

| result | coercive force (Oe) | saturation flux density | square ratio | gloss |
|---|---|---|---|---|
| Ex. | | | | |
| 9 | 990 | 2750 | 0.84 | 185 |
| 10 | 900 | 2700 | 0.82 | 179 |
| 11 | 830 | 2700 | 0.84 | 180 |
| Com. Ex. 2 | 920 | 2100 | 0.75 | 125 |

The tables reveal that the results achieved by Comparative Examples 1 and 2 wherein no kneading step was performed and by Comparative Example 3 wherein the kneading step was not conducted under a high shearing stress were much inferior to those attained by Examples of the invention, thus apparently indicating the advantage of the invention.

We claim:

1. A process for preparing a magnetic coating composition with use of magnetic particles, the process comprising the steps of (a) pre-kneading magnetic particles selected from the group consisting of magnetic particles comprising carbon and metal iron, and magnetic particles comprising at least one iron carbide with an organic solvent under a high shearing stress to form a kneaded magnetic powder and (b) dispersing said powder in a binder.

2. A process as defined in claim 1 wherein the magnetic particles comprising carbon and metal iron contain 2 to 20 wt. % of carbon based on the metal iron.

3. A process as defined in claim 1 wherein the iron carbide is represented by $Fe_xC$ ($x \geq 2$).

4. A process as defined in claim 1 wherein the magnetic particles are kneaded with the organic solvent in a ratio by weight of 100:25 to 100:200.

5. A process as recited in claim 1, wherein said magnetic particles comprise iron carbide.

6. A process as recited in claim 1, wherein said shearing stress is from 0.1 to 10 $kg-cm^2$.

* * * * *